R. R. ZELL.
PROCESS AND APPARATUS FOR MANUFACTURING FERTILIZER
FROM NIGHT-SOIL.
No. 183,242. Patented Oct. 10, 1876.
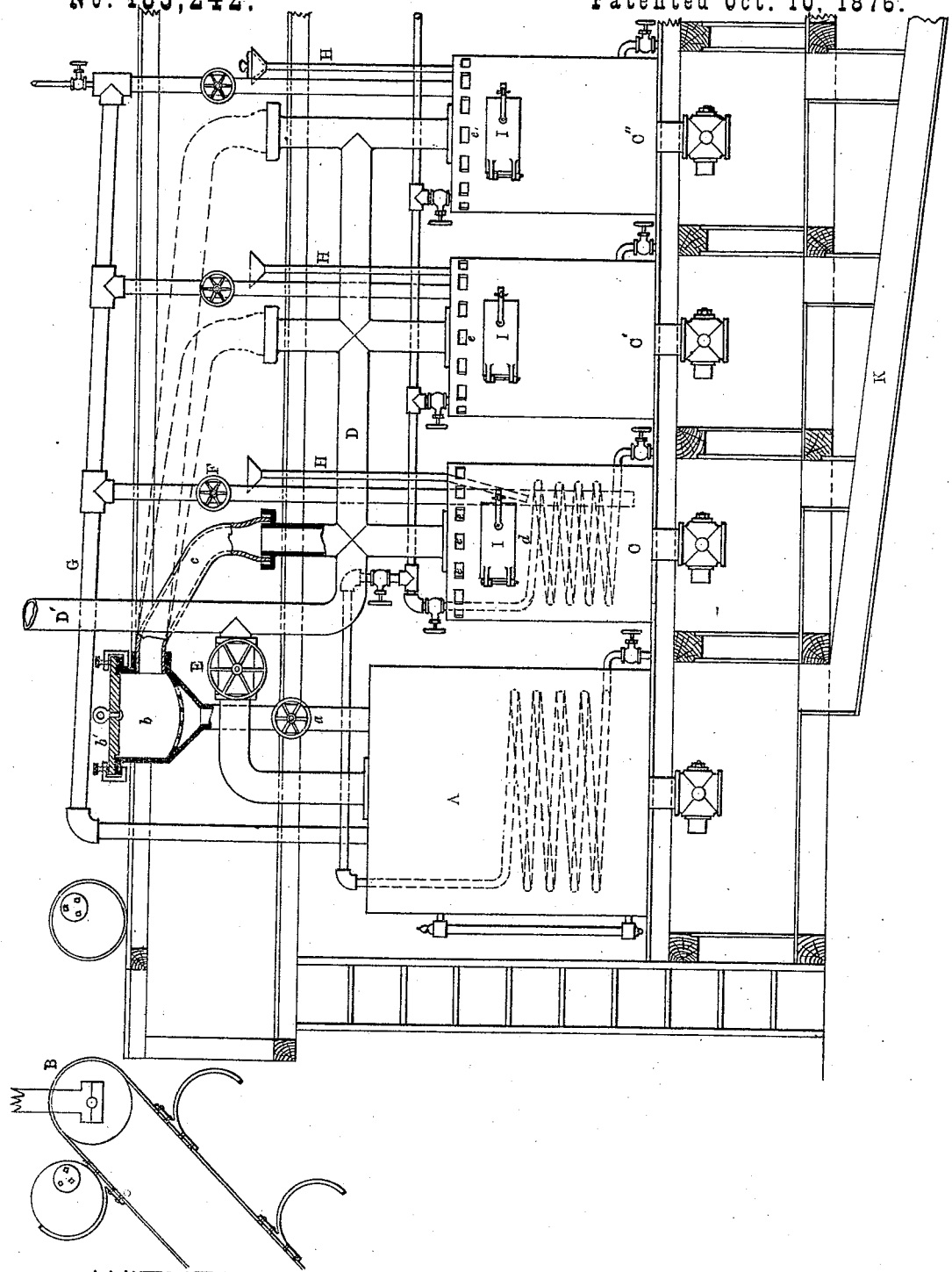

UNITED STATES PATENT OFFICE.

ROBERT R. ZELL, OF BALTIMORE, MARYLAND.

IMPROVEMENT IN PROCESSES AND APPARATUS FOR MANUFACTURING FERTILIZERS FROM NIGHT-SOIL.

Specification forming part of Letters Patent No. 183,242, dated October 10, 1876; application filed June 21, 1876.

*To all whom it may concern:*

Be it known that I, ROBERT R. ZELL, of the city of Baltimore, and State of Maryland, have invented a certain new and useful Process for Manufacturing a Concentrated Fertilizer from Night-Soil, together with the apparatus for carrying out the same, of which process and apparatus the following is a specification; and I do hereby declare that in the same is contained a full, clear, and exact description of my said invention, reference being had to the accompanying drawing, and to the letters of reference marked thereon.

This invention relates, first, to the process of treating human excrement or night-soil in the manufacture of a fertilizing compound; and, secondly, to the apparatus used in said process, as will hereinafter fully appear.

The whole process used in the manufacture of the fertilizer, of which process the invention herein claimed forms a part, is as follows: The night-soil, as collected from vaults or privies, is first strained through a coarse sieve, to remove extraneous substances, such as rags, sticks, &c., and then placed in barrels, or other suitable receptacles, to be used as required. The said material is then, by a second straining operation, divided into two separate parts, viz., the watery constituents, containing little solid matter, but rich in ammonia and certain soluble salts, and a semi-fluid mass, the base of the fertilizing compound. The watery constituent is subjected to the action of heat sufficiently intense to drive off the ammonia, which, by means of suitable apparatus, is incorporated with the semi-fluid mass contained in a separate vessel. The ammonia in the mass is fixed or changed to sulphate of ammonia by the addition to the mass (before the introduction of the ammonia-vapor to the same) of strong sulphuric acid. The compound is now heated to a degree below the boiling-point, and a portion of the moisture evaporated, which moisture, together with the sulphureted hydrogen and other gaseous bodies, is carried to a flue or other place when it is rendered odorless. The phosphoric acid and soluble salts contained in the watery constituent are retained by a supplemental distilling or evaporating operation, and added to the compound. The final mixing operation consists in adding to the compound agricultural salt and muriate of potash, after which the material is thoroughly dried and ground.

Referring to the accompanying drawing, forming a part of this specification, and which represents a partially sectional side elevation of the said apparatus, A is the distilling-tank, from the upper part of which extends the supply-pipe $a$, provided with the strainer $b$. The strainer $b$ is reached by means of an elevated platform, to which the barrels of primarily strained night-soil are carried by an elevator, B. The strainer $b$ is constructed in such manner as to allow of the passage to the distilling-tank of the watery constituent, while the thick or heavy matter is conducted through the pipe $c$ to one of the evaporating-tanks C.

Any desired number of the evaporating-tanks C C' C'' may be employed; but in this description one only, C, will be considered as used.

The evaporating-tank C is connected to the distilling-tank A by a draft-pipe, D, furnished with suitable valves, one of which, E, is used to isolate the said tanks, when necessary, and has extending from it a branch pipe, D', by means of which the noxious gases and other emanations from the matter while under treatment are carried off. The tanks A and C are provided with steam-coils or worms $d$, connected to a boiler, by means of which worms the contents of the said tanks are heated, for purposes hereinafter described. When the evaporating-tank C is about two-thirds full, the strainer $b$ is closed tightly with a cover, $b'$, and the valves E E' in the draft and supply pipes D $a$ closed. A valve, F, in the gas-pipe G, which is shown connecting the distilling and evaporating tanks, is closed, and steam admitted to the coil or worm $d$ in the tank A.

By this means the watery constituent of the night-soil which is contained in the distilling-tank is heated to the boiling-point, and ammonia-vapor generated.

Strong sulphuric acid having previously been added through pipe H to the mass in the evaporating-tank C, the valve F is opened, which allows the ammonia-vapors to pass to the tank C, where the incoming ammonia, together with that in the mass, is changed to sulphate of ammonia.

After the passage of the ammonia from the tank A, which may be hastened by the addition of lime, the compound in tank C is heated by steam to near the boiling-point, to evaporate a portion of the moisture, which, together with the sulphureted hydrogen, &c., is carried through the draft-pipe D and branch thereof, D', to a furnace, where it is burned. This gas, when properly combined with atmospheric air, may be supplied to the furnace in such manner as to assist in the generation of steam, and thereby economize in the consumption of fuel.

As it is necessary, in order to produce a draft in the pipes D and D', that openings should be formed near to the lower ends thereof, the evaporating-tank C is supplied with apertures $e$, through which air passes to form the current required to carry off the vapor and sulphureted hydrogen, &c., generated by the action of the heated coil $d$ in the said tank.

In order to retain the phosphoric acid and soluble salts, before alluded to as contained in the liquid in the distilling-tank A, the said liquid, after the ammonia-vapor is expelled, is drawn off into an evaporating-pan, (not shown,) boiled down to a thick mass, and then added to the compound from the tank C; or the said liquid may be further heated by the steam until evaporated, and the phosphoric acid and soluble salts afterward removed and mixed with the compound from the tank C.

The evaporating-pan should be fitted with a ventilated cover, and pipes leading to a flue, as in the case of the draft-pipe branch D'. In this supplemental evaporating process heat may be applied directly to the pan, and without the steam-coil.

By recharging the distilling-tank A, and conducting the ammonia-vapor eliminated, as before described, to the material in the evaporating-tank C, the percentage of ammonia in the fertilizer may be greatly increased.

All joints in pipes through which offensive gases are conducted should be closely fitted, and where pipes are adapted to be removable, as is the case with the ones $c$, water-luted joints should be employed. All tanks and pipes subjected to the action of the sulphuric acid should be formed of or lined with some non-corrosive material. The tank C is provided with a close-fitting door, I, on the side thereof, to be used in cleaning, and a cock through which the mass is delivered to a vat below, where the phosphoric-acid liquor from the evaporating-pan is added.

To complete the process, the material is conducted through a chute, K, to a vat where the agricultural salt and muriate of potash are added, and the composition thoroughly mixed. The fertilizer is thrown into a heap or pile, and dried by chemical heat generated therein, after which it is ground.

The process of preparing the fertilizer in the tanks C' and C'' is the same as that described in connection with the one C.

Night-soil treated in accordance with the process described gives a concentrated fertilizing compound, as all the ammonia in the solid or semi-fluid matter is retained, as well as that in the liquid drawn off, and evaporated from the distilling-tank A and evaporating-pan in the form of sulphate and phosphate of ammonia.

The said process is free from unpleasant smell, and the production is a fine, dry powder, devoid of all useless matter, such as clay, ashes, and the like, which are usually employed in the manufacture of fertilizers of this class to absorb the water.

Having thus described my invention, what I claim as new, and wish to secure by Letters Patent of the United States, is—

1. In the manufacture of a fertilizing compound from night-soil, the process consisting in separating the night-soil into watery and semi-fluid bodies, distilling the ammonia vapor from the said watery constituent, and incorporating the ammonia vapor with the semi-fluid mass or base of the fertilizing compound after the treatment of the latter with sulphuric acid, for the purpose of fixing the ammonia, substantially as hereinbefore specified.

2. In an apparatus for treating night-soil in the manufacture of a fertilizing compound, the tanks A and C, connected by the draft and gas pipes, respectively, represented by D and G, and provided with the steam coils or worms $d$, in combination with the pipe $a$, having the strainer $b$ leading to the said tank A, and removable pipe $c$, connecting the said strainer indirectly with the tank C, substantially as shown.

3. In an apparatus for treating night-soil in the manufacture of a fertilizing compound, the tank C, provided with the apertures $e$, in combination with the draft-pipe D and branch D' of the same, substantially as and for the purpose set forth.

In testimony whereof I have hereunto set my hand this 15th day of June, 1876.

ROBT. R. ZELL.

Witnesses:
I. SELDNER,
J. T. ROBINSON.